United States Patent [19]

Henry et al.

[11] Patent Number: 4,904,894
[45] Date of Patent: Feb. 27, 1990

[54] HAIL SENSOR

[75] Inventors: John C. Henry, Upper Merion; Kyung Tae Park, Berwyn; Edward Tom, Philadelphia, all of Pa.

[73] Assignee: Pennwalt Corporation, Philadelphia, Pa.

[21] Appl. No.: 302,295

[22] Filed: Jan. 24, 1989

[51] Int. Cl.⁴ .............................................. H01L 41/08
[52] U.S. Cl. .................................. 310/328; 73/170 R; 73/171; 73/DIG. 4; 310/329; 310/800; 310/339; 340/602
[58] Field of Search ........................ 310/322-324, 310/328, 338, 339, 800; 73/DIG. 4, 170 R, 170 A, 171; 340/582, 601, 602

[56] References Cited
U.S. PATENT DOCUMENTS

| | | | |
|---|---|---|---|
| 1,123,012 | 12/1914 | Roby | 340/602 |
| 1,137,674 | 4/1915 | Smith | 340/602 |
| 2,419,454 | 4/1947 | LeClair | 244/134 |
| 2,443,687 | 6/1948 | Marquard | 200/52 |
| 2,717,957 | 9/1955 | Ohlheiser | 250/27 |
| 3,157,800 | 11/1964 | Burwell | 307/116 |
| 3,341,835 | 9/1967 | Werner et al. | 340/234 |
| 3,408,477 | 10/1968 | Kolster | 219/200 |
| 3,530,453 | 9/1970 | Rossier | 340/234 |
| 3,575,641 | 4/1971 | Long | 317/153 |
| 3,706,981 | 12/1972 | Hart | 340/244 R |
| 4,068,133 | 1/1978 | Burwell | 307/116 |
| 4,193,010 | 3/1980 | Kompanek | 310/324 X |
| 4,603,316 | 7/1986 | Kobayashi et al. | 310/324 X |
| 4,656,333 | 4/1987 | Murphy | 219/209 |

Primary Examiner—Mark O. Budd
Attorney, Agent, or Firm—Bernard F. Plantz

[57] ABSTRACT

A hail sensor is disclosed which contains a piezoelectric transducer positioned to produce an output signal when it is vibrated by a hailstone. In one embodiment, the transducer is mounted on a perforated member which is exposed to falling precipitation. In an alternative embodiment, the hailstone impacts a rebound surface and is deflected toward the transducer where an electrical output is produced.

22 Claims, 3 Drawing Sheets

HAIL SENSOR

BACKGROUND OF THE INVENTION

The present invention relates to sensors for detecting falling hail and, more particularly, to such sensors employing piezoelectric transducers.

Sensors and sensing systems for detecting falling precipitation are known in the art. The simplest systems for detecting rain contain an alarm circuit with a switch that is actuated by falling rain. For example, U.S. Pat. No. 1,123,012 discloses a rain sensor containing such a circuit with a spring loaded switch that is held open by a string. A chemical substance, such as calcium phosphide, which immediately takes fire when becoming wet by the falling rain, burns the string allowing the switch to close and activate the alarm. Other rain indicators, such as U.S. Pat. No. 1,137,674, contain a pivoting switch which is closed when rain is collected in a container mounted on the switch. In U.S. Pat. No. 2,443,687, the contacts of a spring loaded switch are separated by a water soluble wafer. When falling rain wets the wafer, it is crushed by the spring loaded contacts thereby closing the electric circuit and energizing the alarm.

Devices for detecting when snowfall reaches a predetermined height have also been developed. U.S. Pat. No. 3,530,453 discloses a snowfall alarm which comprises a photocell and light source cooperatively mounted on opposite sides of a vertically adjustable table on which the falling snow accumulates. When snow accumulates to the height of the light beam between the photocell and light source, an alarm is sounded.

Electrodes or windings that are bridged by the accumulation of falling precipitation have also been used to activate an alarm circuit. The electrodes generally consist of two parallel disposed electrically conductive screens connected in series. Moisture which bridges the small gap between the two screens completes the circuit and thereby energizes an alarm or other equipment. Examples of such systems can be found in U.S. Pat. Nos. 2,717,957, 3,408,477, 3,157,800, 4,068,133 and 4,656,333.

Other precipitation detectors, such as U.S. Pat. No. 3,575,641, contain heating-sensing elements, such as thermistors, in a bridge circuit. When one of the thermistors is exposed to the falling precipitation and is cooled, the imbalance produced in the bridge circuit is conveyed to a relay which activates a load. When the precipitation stops, the exposed thermistor will warm up and balance the bridge circuit. The relay will then close to deactivate the load.

Systems have also been developed to detect and indicate the presence of ice formed on the surfaces of aircraft, roads, bridges and other vehicles. U.S. Pat. No. 2,419,454 discloses the use of a magnetostriction or piezoelectric device which emits sound waves along a surface where ice may accumulate. If a layer of ice is present on the surface, some of the emitted sound waves are reflected toward a receiver where a reading, proportional to the ice thickness, is displayed on a meter. If the surface is free of ice, none of the sound waves are reflected toward the receiver and a zero reading is displayed on the meter.

Other ice detectors, such as that disclosed in U.S. Pat. No. 3,341,835, employ a magnetostriction or piezoelectric vibrator whose resonant frequency changes as ice builds up on its exposed portions. U.S. Pat. No. 3,706,981 discloses an ice detection system with a piezoelectric crystal whose amplitude of vibration becomes damped as ice forms on the crystal. This damped vibration is detected by the system's circuitry and an appropriate output signal is produced to indicate ice formation.

Although there are various devices for detecting precipitation and the presence of ice on a surface, a need has developed for a sensor which only detects the presence of falling hail. These sensors could be strategically positioned around airports so that aircraft can be guided around areas experiencing a hailstorm.

SUMMARY OF THE INVENTION

The hail sensor of the present invention contains a perforated member which is suspended from a support. At least one piezoelectric transducer is mechanically coupled to the perforated member for detecting vibrations generated within the member when it is contacted by a hailstone. Other falling precipitation, such as rain or snow, either passes through the perforations in the member or has such a low mass that the output signal generated by the piezoelectric transducer can be easily distinguished from the signal generated by a hailstone.

An alternative hail sensor of the present invention comprises a passageway with an upwardly opening mouth which is adapted to receive a hailstone. The passageway contains two mutually facing, spaced apart walls. The first wall forms a rebound surface while the second wall is a piezoelectric transducer. When a hailstone enters the passageway, it contacts the rebound surface and is deflected toward the transducer to induce a vibration within the transducer. This vibration of the transducer produces an electrical output indicating falling hail. Rain or snow which enters the passageway has a relatively inelastic collision with the rebound surface so that no impact occurs with the transducer.

DETAILED DESCRIPTION OF THE PREFERRED EMBODIMENTS

The hail sensors of the present invention include a piezoelectric transducer containing a layer of piezoelectric material with electrodes disposed on its opposed major surfaces. Polyvinylidene fluoride (PVDF) is an example of a polymer film suitable for use as a piezoelectric layer. Polyvinylidene fluoride is approximately 50% crystalline and 50% amorphous. The principal crystalline forms of PVDF are the highly polar beta form and the non-polar alpha form. High piezoelectric activity is associated with the polar beta form. In order to increase the piezoelectric activity of PVDF, the film is mechanically oriented and subjected to an intense electrical field, otherwise known as poling, to cause the oriented beta form crystallites to predominate. Polyvinylidene fluoride films which have been treated in this manner are available from Pennwalt Corporation, Philadelphia, Pa. Other piezoelectric polymer films, including copolymers having a major proportion of vinylidene fluoride and at least one copolymerizable comonomer, preferably a fluorinated olefinic comonomer, such as trifluoroethylene or tetrafluoroethylene, may also be used as a piezoelectric layer in the present invention. Although polymeric piezoelectric layers are preferred, piezo-ceramic materials, such as barium titanate, quartz, lithium tantalate, and PZT, may also be employed.

The electrodes are formed on the piezoelectric layer using conventional techniques. This film metals, such as silver, nickel, aluminum, gold, or alloys thereof, may be deposited on the opposed surfaces of the piezoelectric layer by vacuum evaporating or sputtering. These this film metals have thicknesses which generally range between about 100 Å (Angstroms) to about 1000 Å. Alternatively, the electrodes may be deposited across the opposed surfaces of the piezoelectric layer by screen printing an electroconductive ink, such as silver flake filled urethane or carbon based conductive coatings. The electrodes formed from electroconductive inks have thicknesses which generally range between about 0.5 $\mu$m (micron) to about 2 $\mu$m. As an alternative to evaporatively deposited or screen printed electrodes, foils of copper, aluminum or other conductors, typically 10 $\mu$m to 100 $\mu$m in thickness, can be adhesively applied and capacitively coupled to the unmetallized piezoelectric layer.

Figure 1:
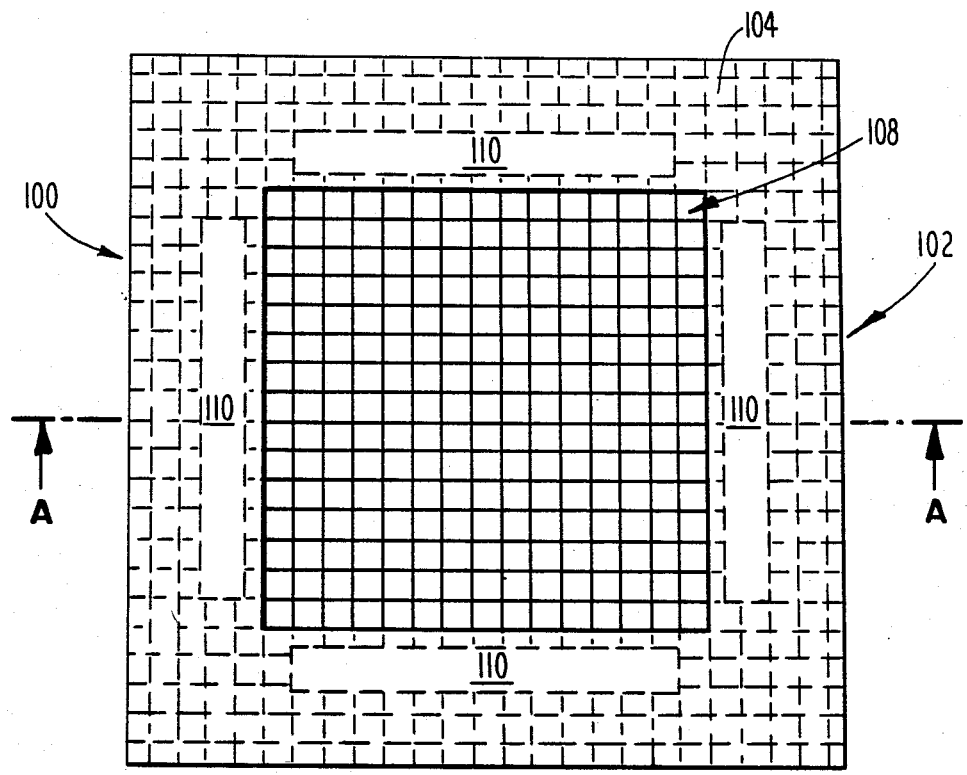
FIG. 1 is a plan view of the hail sensor of the first embodiment of the present invention.
Figure 2:
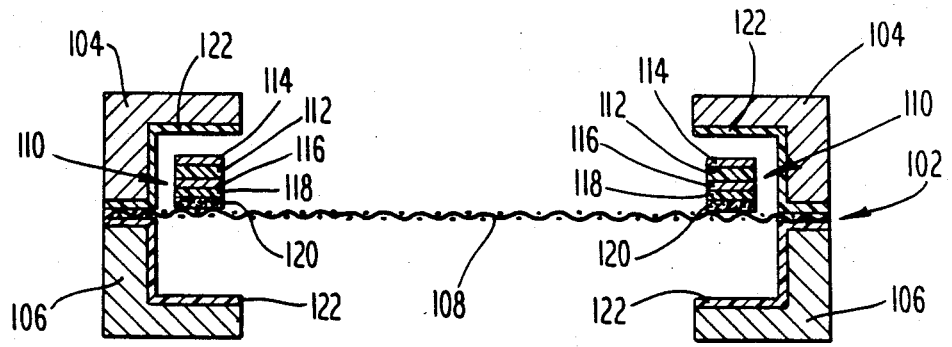
FIG. 2 is a section view taken along line A—A in FIG. 1.

Referring now to the figures, where like reference numerals identify like elements, FIGS. 1 and 2 illustrate the hail sensor of the first embodiment of the present invention. The sensor 100 contains a picture frame-like housing 102 comprising upper and lower halves 104 and 106, respectively, having L-shaped cross sections. The housing can be constructed from aluminum, stainless steel, or other similar materials. The housing 102 serves to support a perforated member 108 which is suspended across the opening. The perforated member 108 can be a metallic mesh screen having openings which are smaller than the hailstone to be sensed. Typically, the openings in the screen are approximately one-eighth inch across. Alternatively, other materials, such as plastic, containing a plurality of apertures can be used as the perforated member 108. The perforated member 108 is sandwiched between the upper 104 and lower 106 halves of the housing 102. The two halves 104 and 106 are secured together with bolts or other conventional fasteners (not shown).

A plurality of piezoelectric transducers 110 are mechanically coupled to the perforated member 108 adjacent to its edges. The transducers 110 contain a piezoelectric layer 112, such as uniaxially oriented PVDF having a thickness of about 28 $\mu$m, with a first electrode 114 disposed on a first opposed surface and a second electrode 116 disposed on a second opposed surface. An electrically insulating polymeric film 118, such as polyethylene terephthalate, having thickness of between about 0.001 and about 0.01 inch, is applied over the second electrode 116. The polymeric film 118 is used to electrically isolate the electrode 116 from the perforated member 108. The piezoelectric transducer 110 is mechanically coupled to the perforated member 108 with an adhesive layer 120, such as double-sided tape, epoxy or a urethane-based adhesive manufactured by Lord Corporation under the trademark Tycel. As shown in FIG. 2, the transducers are concealed by the housing 102.

The transducers 110 are connected in parallel with conductors (not shown). The output from the transducers is then supplied to conventional processing circuitry, such as peak detectors and counters, which detects the electrical signal produced by the transducer when it senses the vibrations within the perforated member 108 generated by the falling hailstones. These electrical signals can also be detected by a conventional oscilloscope. Although the figures illustrate the use of four transducers, it should be understood that any number of transducers can be employed.

A vibration absorbing material 122, such as foam, cork or a coating of an absorbing material, is conformally positioned between the perforated member 108 and the housing halves 104 and 106. This vibration absorbing layer 122 is used to absorb vibrations in the perforated member 108 after they have been detected by the transducer 110. This prevents a ringing effect which would otherwise occur due to the repeated reflection of the vibration by the housing walls along the perforated member 108.

Although the figures illustrate a substantially square configuration, the hail sensor can be fabricated in a curved or other configuration. The hail sensor 100 is mounted so that the perforated member 108 is in a substantially horizontal plane. When a falling hailstone contacts the perforated member 108, a significant vibration is produced and transmitted to the transducer 110 where a corresponding electrical output signal is generated. If other precipitation, such as rain or snow, falls, it either passes through the voids within the perforated member 108 or is of such a low mass that only a small electrical output signal is produced by the transducer 110. This output signal is of such a small magnitude that the processing circuitry can easily distinguish it from the signal generated by a falling hailstone. Ambient vibrations, such as aircraft engine noise, are generally not detected by the transducer 110 because of the large void space within the perforated member 108.

Figure 3:
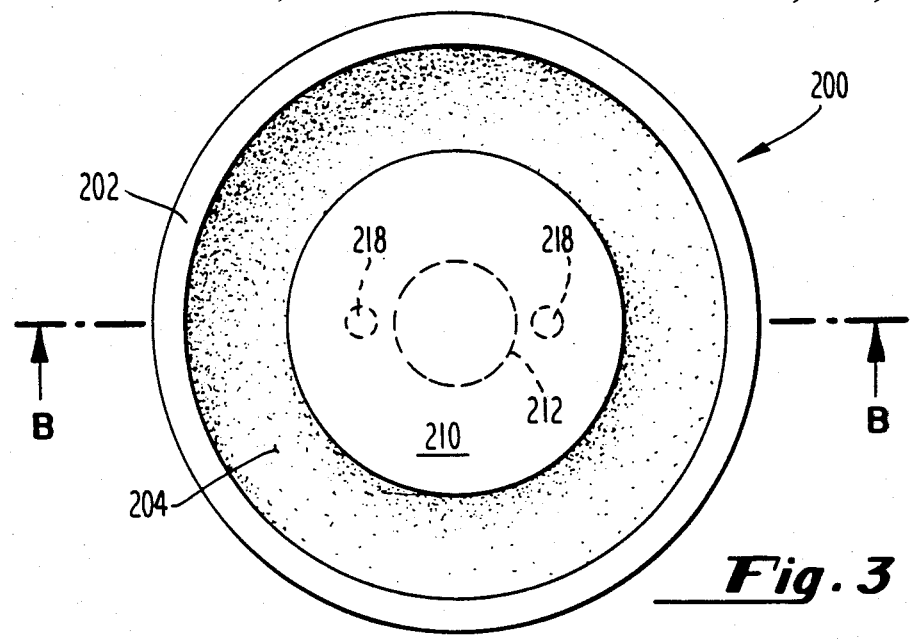
FIG. 3 is a plan view of an alternative hail sensor of the present invention.
Figure 4:
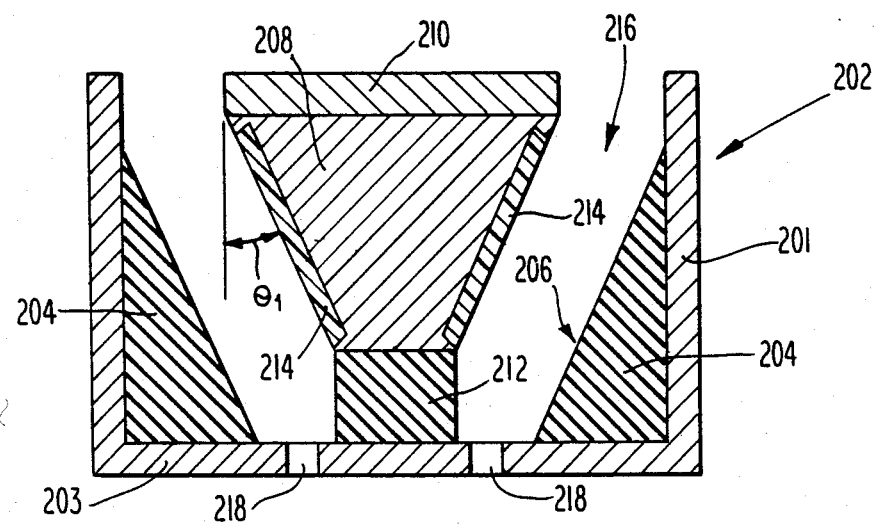
FIG. 4 is a section view taken along line B—B in FIG. 3.

Turning now to FIGS. 3 and 4, the hail sensor of the second embodiment of the present invention is generally identified as 200. This sensor contains a cylindrical housing 202 having an open top and a bottom 203. The housing 202 is constructed from a rigid material, such as aluminum or stainless steel. A rebound member 204, such as rubber, aluminum or plastic, is disposed within the housing along both the upstanding wall 201 and the bottom 203. The rebound member 204 has a rebound surface 206 which is continuous along the interior of the housing 202 and is exposed to the open top.

An inverted frustrum 208 is disposed within the housing 202 on a mounting block 212, such as rubber. The frustrum 208 can be fabricated from aluminum, stainless steel and other suitable materials. The frustrum 208 also contains a disc-like member 210 disposed over its base. The disc-like portion 210 can be fabricated from materials similar to those used for the frustrum 208. The piezoelectric transducer 214 is mounted within a groove formed along the side of the frustrum 208 with an adhesive, such as epoxy. The groove and the transducer mounted herein extend around the circumference of the frustrum 208. As shown in FIG. 4, the transducer 214 and the rebound surface 206 form a passageway 216 with an upwardly opening mouth. The transducer 214 and the mutually opposed rebound surface 206 are substantially parallel at an angle $\theta_1$ between about 5 to about 85 degrees and preferably about 30 to about 40 degrees with respect to vertical. Apertures 218 are also disposed below the passageway in the bottom 203 to allow for the drainage of any accumulated precipitation.

When a hailstone enters the housing through the passageway 216, it has an elastic collision with the rebound surface 206 such that is rebounds and contacts the transducer 214. The impact of the hailstone with the transducer 214 generates a vibration which is detected by the transducer and a corresponding electrical output is produced. This electrical output is then supplied to conventional processing circuitry, such as peak detector and counters. The output may also be supplied to an oscilloscope. However, when rain or snow enters the passageway 216, a relatively inelastic collision occurs with the rebound surface 206 such that there is no rebound toward the transducer 214. This type of precipitation typically slides down the inclined rebound surface 206 and is drained from the housing 202 through the apertures 218.

Figure 5:
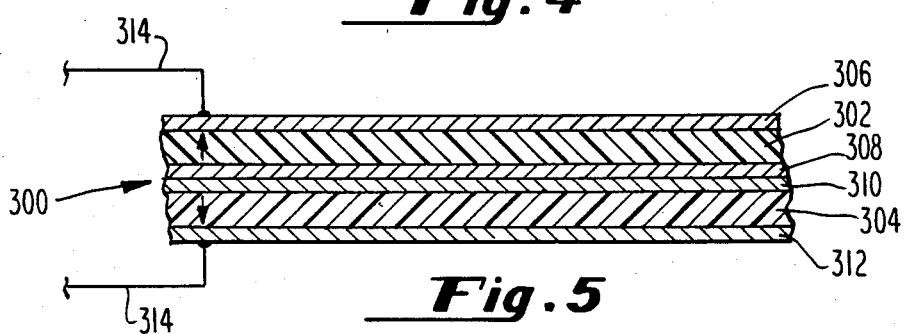
FIG. 5 is a section view of the piezoelectric transducer used in the hail sensor of FIGS. 3 and 4.

Referring now to FIG. 5, a cross section of the piezoelectric transducer used in the sensor 200 is shown. As shown in this figure, the transducer 300 contains a bimorph laminate of two piezoelectric layers, such as polymeric piezoelectric films having substantially opposed poling directions as shown by the arrows. The first piezoelectric film 302 contains first and second electrodes 306 and 308, respectively, disposed along its opposed major surfaces. In the same manner, the second piezoelectric film 304 contains third and fourth electrodes 310 and 312, respectively. The films 302 and 304 with their respective electrodes are laminated together with a conductive adhesive so that electrical contact is made between the second and third electrodes 308 and 310, respectively. Leads 314 are formed on the first and fourth electrodes 306 and 312, respectively, so that the output signal generated by the transducer can be detected by the processing circuitry. In this arrangement, if the housing 202 should be vibrated by sound or precipitation impacting the disc-like member 210, the transducer shown in FIG. 5 performs common mode rejection so that no electrical output is produced. However, when a hailstone enters the passageway 216 and contacts the transducer such that both of the piezoelectric films are not simultaneously vibrated, an output signal is produced across the leads 314. It should also be understood that a single layer of piezoelectric film with electrodes can also be used as the transducer 214.

Figure 6:
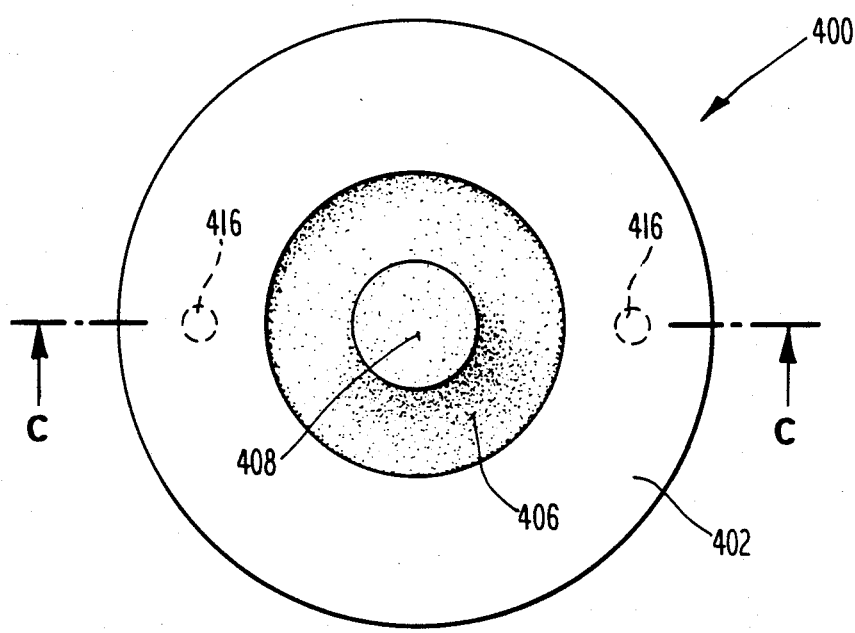
FIG. 6 is a plan view of a further alternative hail sensor of the present invention.
Figure 7:
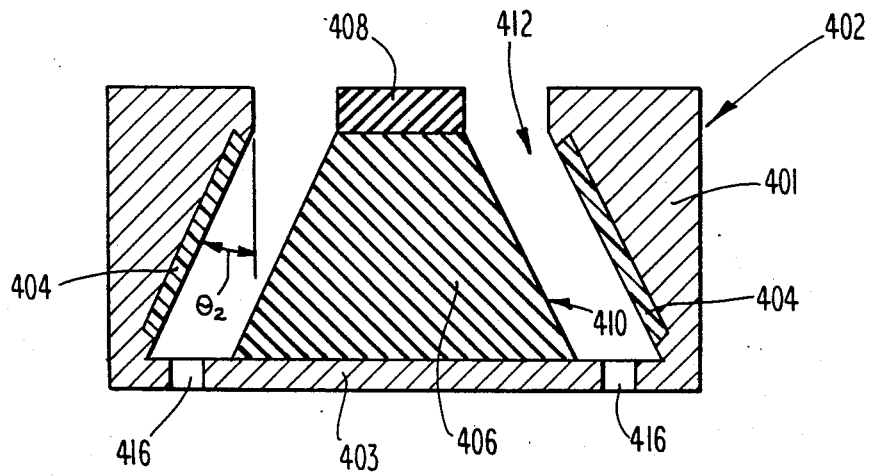
FIG. 7 is a section view taken along line C—C in FIG. 6.

Referring now to FIGS. 6 and 7, the third embodiment of the present invention is generally designated as 400. The sensor 400 operates on the same principles as the sensor 200 shown in FIGS. 3 and 4. In the sensor 400, the locations of the rebound surface and the transducer are reversed. The sensor 400 contains a housing 402 fabricated from aluminum, stainless steel or other similar materials. The housing has an upstanding wall 401 and a bottom 403. The piezoelectric transducer 404 is mounted within a groove along the wall 401 of the housing 402.

An upright frustrum forming the rebound member 406 is centrally disposed within the housing. The frustrum 406 can be fabricated from materials similar to those used for the rebound member 204 in FIG. 2. The frustrum has a rebound surface 410 which is exposed to the open top and is in a substantially opposed parallel relationship with the transducer 404. The transducer 404 coaxially surrounds the rebound surface 410. The rebound surface 410 and the piezoelectric transducer 404 are at an angle $\theta_2$ of between about 5 to about 85 degrees and preferably about 30 to about 40 degrees with respect to vertical. The rebound surface 410 and the transducer 404 also define a passageway 412 with an upwardly opening mouth to receive the hailstone. A disk-like member 408, fabricated from rubber or the material used for the frustrum 406, is mounted on the top of the frustrum. As with the previous embodiment, apertures 416 are provided in the bottom 403 to allow rain and other precipitation to drain from the device. The transducer 404 has the bimorph configuration shown in FIG. 5 so that common mode rejection to eliminates vibrations which are simultaneously acting upon the piezoelectric films. However, when a hailstone enters the passageway 412, it is deflected by the rebound surface 410 and impacts the piezoelectric transducer 404 which produces a corresponding electrical output. When common mode rejection is not needed, a single layer of piezoelectric film with electrodes can be used as the transducer 404.

Although the sensors shown in FIGS. 3, 4, 6 and 7 are substantially cylindrical with conical shaped interior portions, the housing may also be polygon-shaped with a centrally disposed pyramid.

Various changes and modifications can be made to the above-described embodiments without departing from the spirit and scope of the present invention.

We claim:

1. A hail sensor, comprising:
   a support member;
   a perforated member suspended from said support member; and
   at least one piezoelectric transducer mechanically coupled to said perforated member for detecting vibrations generated in said perforated member when it is contacted by a hailstone.

2. A hail sensor according to claim 1 wherein said support member is a housing having an opening with said perforated member suspended across said opening.

3. A hail sensor according to claim 2 wherein said perforated member has at least one edge and said at least one piezoelectric transducer mechanically coupled to a portion of said perforated member adjacent to said at least one edge and concealed by said housing.

4. A hail sensor according to claim 3 wherein a plurality of said piezoelectric transducers are mechanically coupled to portions of said perforated member adjacent to said at least one edge.

5. A hail sensor according to claim 4, further comprising:
   a vibration absorbing material disposed between said perforated member and said housing.

6. A hail sensor according to claim 5 wherein the perforations in said perforated member are smaller than a hailstone.

7. A hail sensor according to claim 6 wherein said perforated member is mesh screen.

8. A hail sensor according to claim 7 wherein the openings in said screen are approximately ⅛ inch across.

9. A hail sensor according to claim 4 wherein said piezoelectric transducer comprises:
   a piezoelectric polymer film with opposed first and second surfaces;

a first electrode electrically coupled to said first surface; and a second electrode electrically coupled to said second surface.

10. A hail sensor, comprising:
a passageway with an upwardly opening mouth adapted to receive a hailstone, said passageway comprising two mutually facing, spaced apart walls, the first of which forms a rebound surface and the second of which is a piezoelectric transducer.

11. A hail sensor according to claim 10 wherein said two mutually facing, spaced apart walls are substantially parallel and disposed at an angle relative to vertical.

12. A hail sensor according to claim 11 wherein said passageway further comprises at least one downwardly extending opening.

13. A hail sensor according to claim 12 wherein said angle is between about 5 and about 85 degrees.

14. A hail sensor according to claim 12 wherein said piezoelectric transducer comprises a bimorph laminate of two piezoelectric polymer films having substantially opposite poling directions.

15. A hail sensor according to claim 12 wherein said first wall is rubber.

16. A hail sensor, comprising:
a housing having an open top;
a rebound member disposed within said housing and having a rebound surface exposed to said open top;
a piezoelectric transducer having a pair of opposed surfaces; and
means for mounting said transducer within said housing with the first of the opposed transducer surfaces in a substantially opposed parallel relationship with said rebound surface and the second of the opposed transducer surfaces concealed from said open top whereby a hailstone entering said open top contacts said rebound surface and is diverted toward said piezoelectric transducer.

17. A hail sensor according to claim 16 wherein said housing further comprises an opening below the passageway formed by said rebound surface and the first opposed surface of said transducer.

18. A hail sensor according to claim 17 wherein said means for mounting is an inverted frustrum centrally disposed within said housing and said rebound surface is coaxially disposed around said frustrum.

19. A hail sensor according to claim 18 wherein said piezoelectric transducer is mounted along the side of said frustrum.

20. A hail sensor according to claim 19 wherein said piezoelectric transducer comprises a bimorph laminate of two poled piezoelectric polymer films having substantially opposite poling directions.

21. A hail sensor according to claim 17 wherein said rebound member is an upright frustrum centrally disposed within said housing with said transducer coaxially disposed around said frustrum.

22. A hail sensor according to claim 21 wherein said piezoelectric transducer comprises a bimorph laminate of two poled piezoelectric polymer films having substantially opposite poling directions.

* * * * *